United States Patent
Nishizu et al.

[11] 3,958,605
[45] May 25, 1976

[54] AUTOMATIC CONTROLLING DEVICE FOR MAINTAINING A CONSTANT RATE OF AIR FLOW IN AIR-CONDITIONING EQUIPMENT

[75] Inventors: Eisuke Nishizu; Michitomo Okubo; Eiichi Wada, all of Neyagawa, Japan

[73] Assignee: Sinko Kogyo Co., Ltd., Osaka, Japan

[22] Filed: Nov. 25, 1974

[21] Appl. No.: 527,147

[30] Foreign Application Priority Data
Apr. 23, 1974  Japan................................ 49-46208

[52] U.S. Cl................................. 138/46; 137/504; 137/556.3
[51] Int. Cl.²........................................ G05D 7/00
[58] Field of Search .......... 137/504, 517, 535, 525, 137/521, 512.15, 499, 497, 556.3; 138/45, 46, 42, 43; 251/336, 212; 73/207, 213

[56] References Cited
UNITED STATES PATENTS

| | | |
|---|---|---|
| 2,577,405 | 12/1951 | Cones ................................. 138/45 |
| 2,890,716 | 6/1959 | Werder ............................ 138/46 X |
| 3,000,395 | 9/1961 | Waterfill ........................... 138/46 X |
| 3,179,125 | 4/1965 | O'Day et al ...................... 138/46 X |

*Primary Examiner*—Martin P. Schwadron
*Assistant Examiner*—Robert J. Miller
*Attorney, Agent, or Firm*—Wenderoth, Lind & Ponack

[57] ABSTRACT

The present invention relates to automatic control devices generally for the purpose, in the terminal equipment of an air-conditioning system which blows conditioned air, flowing thereinto through the duct from the central air conditioner, out into the room, of keeping the rate of flow at a certain fixed level. More specifically, the present invention relates to a new and improved type of automatic control device which is worked in a stabilized condition at as low wind pressure as possible and which is capable of blowing air out always at a certain prefixed rate of flow irrespective of fluctuations of the pressure inside the duct.

1 Claim, 8 Drawing Figures

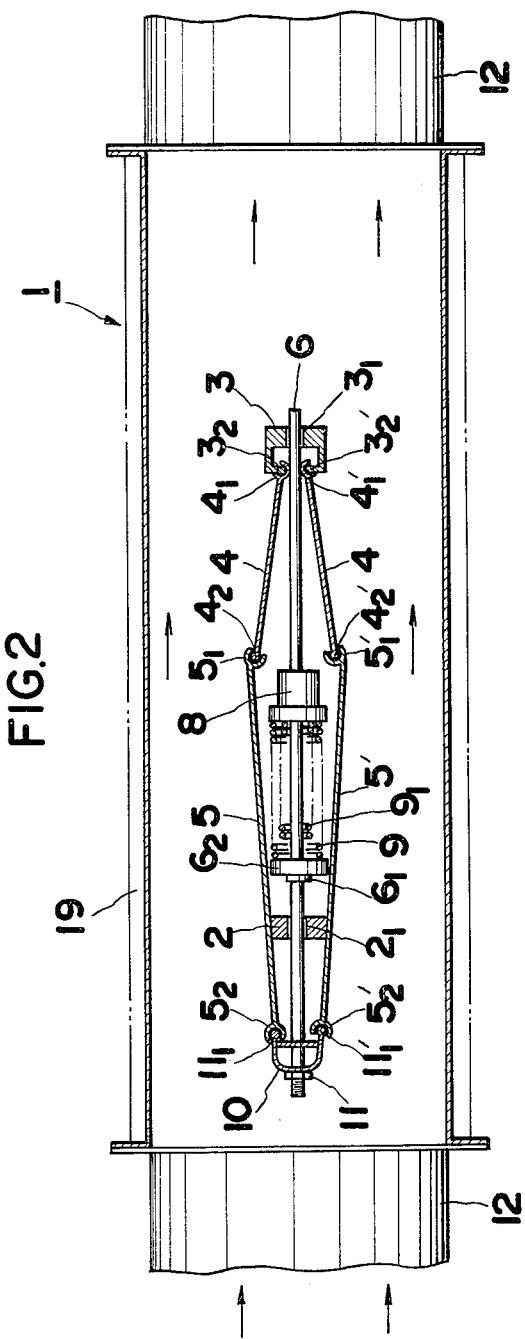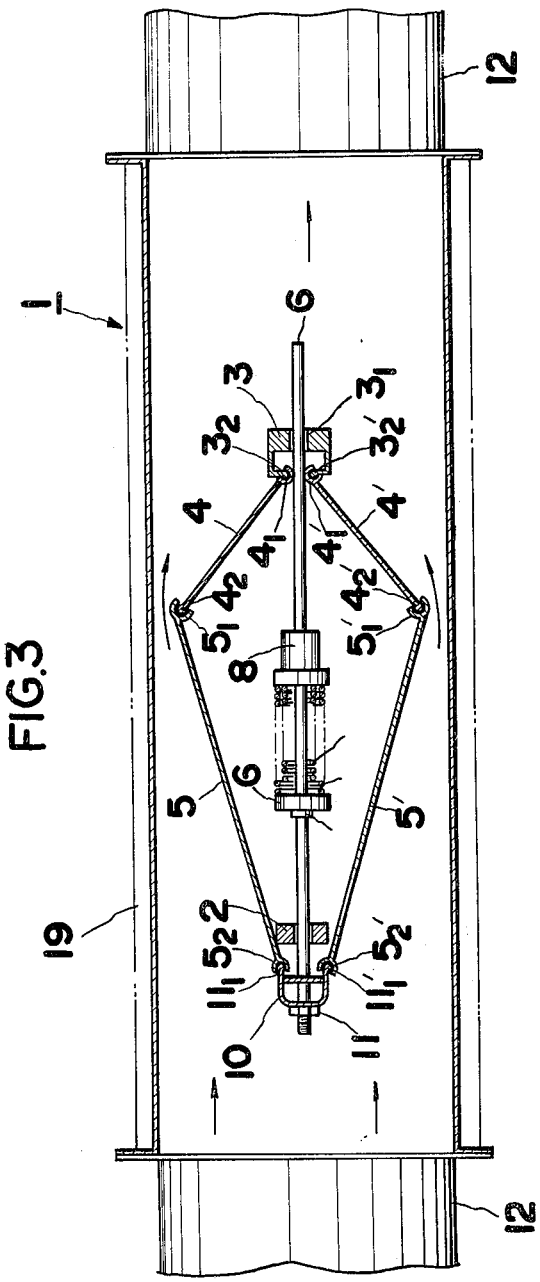

AUTOMATIC CONTROLLING DEVICE FOR MAINTAINING A CONSTANT RATE OF AIR FLOW IN AIR-CONDITIONING EQUIPMENT

BACKGROUND OF THE INVENTION

In an air-conditioning system, generally, there are two methods of adjusting the room temperature due to fluctuations of the heat load inside the room to maintain it a fixed level. Either regulate only the air temperature of the air supplied while the air flow rate is kept at a fixed level or vary only the amount of air blown out. To accomplish this purpose, it is essential in the former case that the amount of air blown out be accurately kept at a fixed level and in the latter case, it is essential that the air flow rate which varies from time to time maintained at a fixed value irrespective of pressure fluctuations inside the duct at each such point of time. In practice, however, the flow rate of conditioned air from the central air conditioner, which blows out into the room through the duct, is afffected by fluctuations in the wind pressure inside the duct. In other words, with the increase and decrease in the wind pressure inside the duct, the wind pressure is converted into velocity head near the outlet. Thus, the air flow rate increases or decreases, and it is not always possible to maintain it at a prefixed level. To maintain a constant rate of air flow irrespective of such fluctuations of the wind pressure inside the duct is the problem to be solved.

In the conventional type of automatic control device for maintaining the air flow rate at a certain fixed level the mechanism is such that the wind pressure inside the duct, the total pressure, is received by a pressure-receiver plate, and by the balancing the reaction of the pressure-reeceiver plate and the stress of a mechanical spring, an air-throttling locomotor is shifted, thereby opening and closing the air passage by degrees to increase and decrease its area. The total pressure inside the duct is the sum of static and dynamic pressures, and of the two pressures, the dynamic pressure is liable, to deflect in the lengthwise or crosssectional direction of the duct, and change its value by a large margin depending the shape of the duct or upon the wind velocity inside the duct, thus displaying a strong tendency for channeling and pulsing. Consequently, the total pressure has the same tendency as the said dynamic pressure for channeling and pulsing, thereby making the action of the aforementioned air-throttling locomotor unstable. This constitutes a shortcoming of the conventional type of automatic air flow rate controller.

SUMMARY OF THE INVENTION

The first object of the present invention is to provide a new and improved type of automatic controlling device for maintaining a constant rate of air flow, whereby the functional shortcoming, as stated above, of the existing type of such controlling device is obviated; which is simple to construct and, hence, can be manufactured at low cost; and which can be operated smoothly and accurately.

Another object of the present invention is to provide an automatic controlling device for maintaining a constant rate of air flow wherein the operation of opening and closing the air passage is done by means of pressurereceiver plates which are worked by the static pressure only, instead of the total pressure which is susceptible to channeling and pulsing as stated above, whereby the action is relatively stabilized, and which are little affected by the dynamic pressure, thus ensuring that such operation is done in a stabilized manner.

Still another object of this invention is to provide an automatic controlling device for maintaining a constant rate of air flow wherein the air current is first made to gradually contract towards the direction of its progress and is then made, after passing through the narrowest passage, to gradually expand so that the occurrence of vorticose current may be minimized, thus eliminating the possibility of the air current making a loud noise as is generally the case with the conventional type of air-throttling mechanism.

The fourth object of the present invention is to provide an automatic controlling device for maintaining a constant rate of air flow which is so devised as to be capable of preventing the phenomenon of sympathy with the pulsating wind pressure in a certain zone of the pulsing pressure inside the duct which is incidental to the conventional type of such controlling device.

These objects are accomplished by the parts and components of the invention, their improvements over those of the existing types, their combinations and operation which together constitute the substance of the present invention; an embodiment of the invention is illustrated in the annexed drawings and is fully explained in the description hereinafter set forth.

BRIEF DESCRIPTION OF THE DRAWINGS

FIG. 2 is a side sectional view taken on line 2 — 2 of FIG. 1 and shows a state wherein the air current is expanding from the contraction of the guide plates and pressure-receiver plates.

FIG. 3 is a side sectional view taken on line 2 — 2 of FIG. 1, showing a state wherein the air current is contracting from the expansion of the guide and pressure-receiver plates.

DETAILED DESCRIPTION OF THE INVENTION WITH REFERENCE TO THE DRAWINGS

Figure 1:
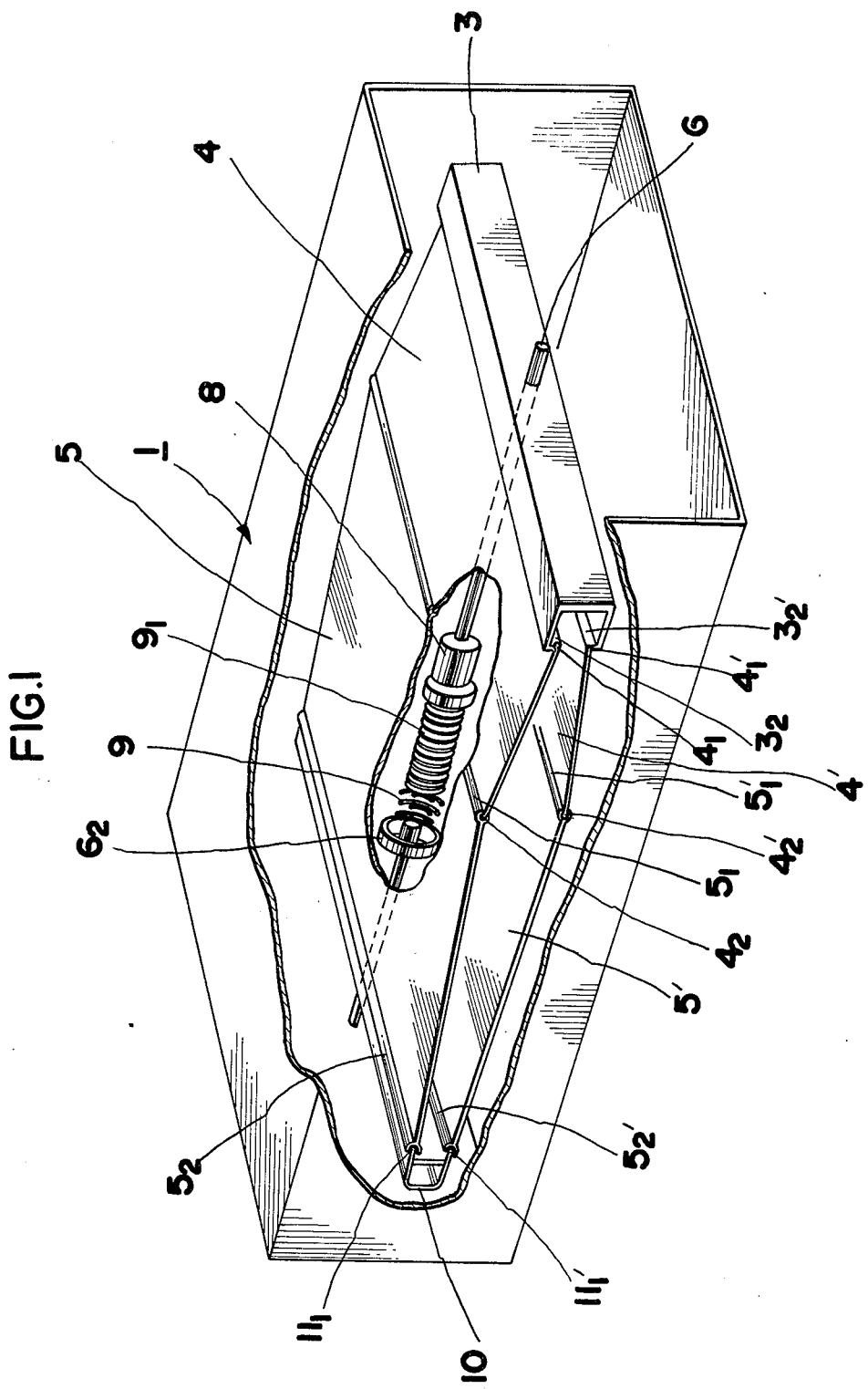
FIG. 1 is an oblique, cutaway view of a device in accordance with the present invention, showing its essential parts.
Figure 4:
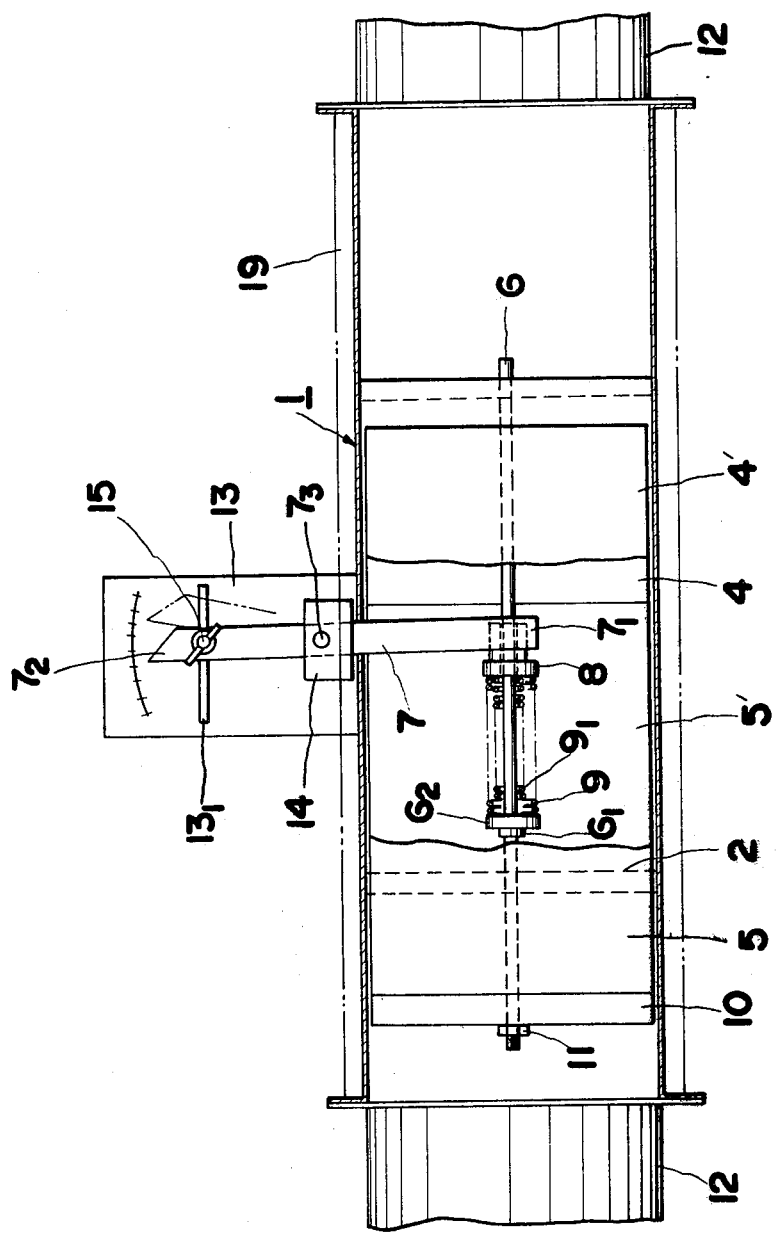
FIG. 4 is a plan of the device partly cut away on line 4 — 4 of FIG. 1, and shows a mechanism for manually regulating the spring setting height.

In FIGS. 2 and 3, the casing 1 of the device is oblong in shape, and a bearing beam 2 with a rectangular cross section is mounted crosswise inside the casing 1 at its forward end. Through the centre thereof is bored a shaft hole $2_1$. An additional bearing beam 3 is mounted crosswise inside the casing at its rear; it is in the shape of a square-root, deep channel bar with a thick web and thinner flanges. Through the centre of the web is a shaft hole $3_1$. The ends of the two flanges are bent upward and downward respectively, and their edges are further worked on so as to make cylindrical forms $3_2$ and $3_2{'}$. The numerals 4 and 4' designate, respectively, the upper and lower pressure-receiver plates. Of each such plate 4, 4', one end is formed into a curve, thus forming curves $4_1$ and $4'_1$ which is made to embrace the aforesaid cylindrical parts $3_2$ and $3_2{'}$ of the bearing beam 3 thereby forming hinges which permit said plates to swing upward and downward. The other ends of said plates are made into cylindrical forms $4_2$ and $4'_2$. The numerals 5 and 5' designate, respectively, the upper and lower guide plates. One end of each of these plates 5, 5' is formed into a curve, thus forming curves $5_1$ and $5'_1$ which are made to embrace, loose-jointedly, the aforesaid cylindrical parts $4_2$ $4_2{'}$ of the pressure-receiver plates 4 and 4' so as to form hinges. The other ends of the plates are also made into curves $5_2$ and $5_2{'}$. A shaft 6 is mounted through the shaft holes, $2_1$ and $3_1$, respectively, of the bearing beams 2 and 3. Around the middle part of the said shaft 6 are mounted, concentric to the axis of the shaft, a coil spring 9 and an auxiliary coil spring $9_1$ inbetween a seat $6_2$ fastened on to the shaft 6 with a fastener $6_1$ and a sliding regulator piece 8 supported in the forked part $7_1$ of a regulating rod 7 for adjustment of the spring setting length (FIG. 4). A support 10 with a U-shaped profile is fastened onto one end of the shaft 6 with a nut 11 screwed on it. The two edges of the support are made into cylindrical forms $11_1$ and $11_1$, which are made to be embraced, loose-jointedly, by the aforementioned curves $5_2$ and $5'_2$ of the guide plates 5 and 5' respectively, so as to form hinges. The numeral 12 designates the duct.

In FIG. 4, a regulating rod 7 for adjustment of the spring setting length is, at its middle, pivotally supported on a support 14 by a pin $7_3$, the upper end of which constitutes the pointer $7_2$ of a calibrated board 13. The rod 7 is fixed with a thumbscrew 15 at a certain point along a guide slot $13_1$ of the calibrated board 13, thereby making it possible to manually adjust the force of the springs at will.

Figure 5:
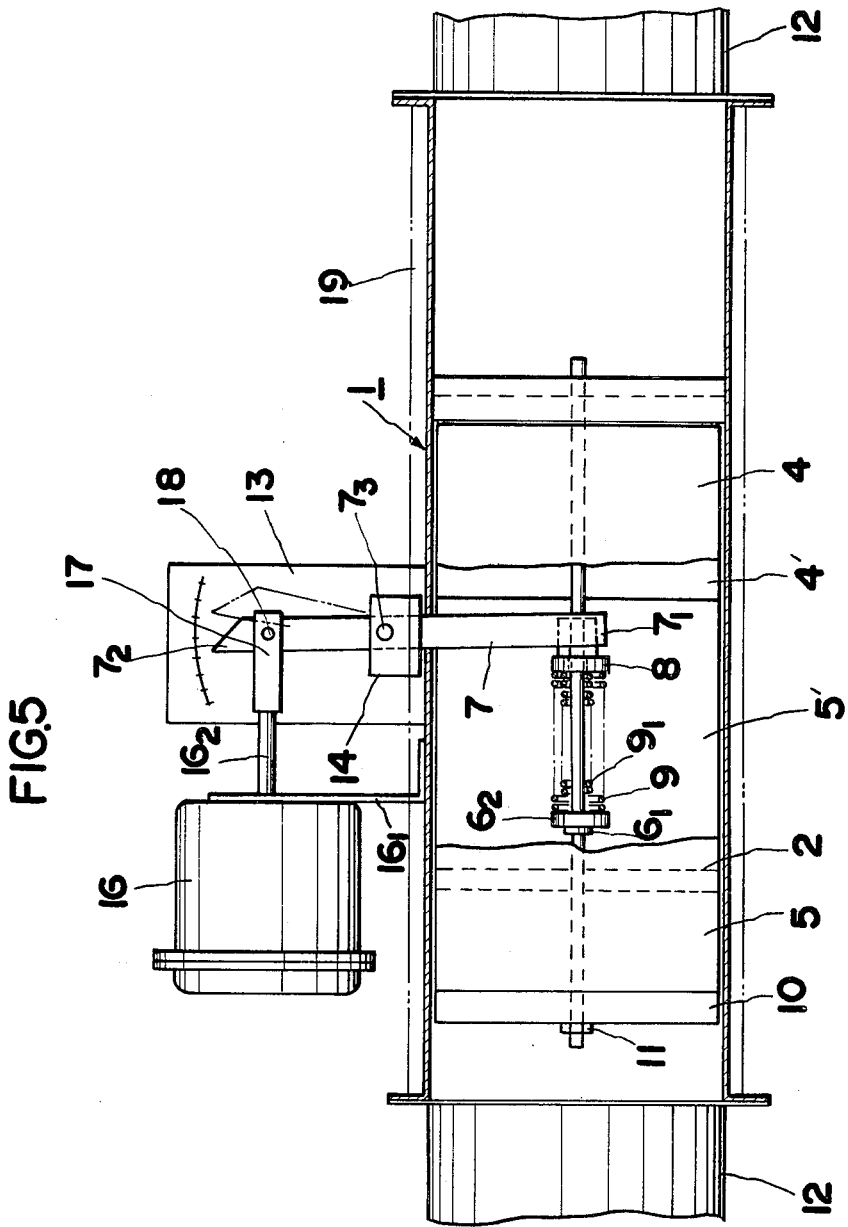
FIG. 5 shows a mechanism for regulating, by a motor, the spring setting height.

In FIG. 5, the numeral 16 designates a motor, $16_1$ a supporter of the motor, and $16_2$ the driving shaft of the motor; and the numeral 17 indicates a fork pivotally supported on a pin 18 in the upper part of the regulating rod 7 for adjustment of spring setting height.

Figure 8:
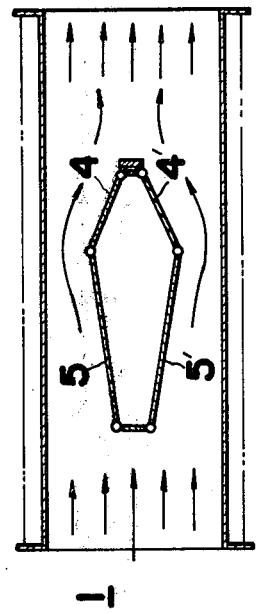
FIG. 8 is a rough sketch of a side section of the device according to this invention and shows the relation between the device and the streamline of air flowing through the passage "$a$".

Air blown into the device through the duct 12 passes, as illustrated in FIGS. 2 and 8, through the passages "$a$" — the spaces between the inside wall of the casing 1 and the two combinations of guide and pressure-receiver plates, viz., 5 and 4, and 5' and 4', respectively, with its stream being gradually contracted. This course of air flow is shown by arrows in FIG. 8. During this time, the static pressure portion of the said air current enters the space shut in by the two guide plates 5 and 5' and the two pressure-receiver plates 4 and 4' and acts as a force to push them upward and downward respectively, thereby expanding the space inbetween them, as illustrated in FIG. 3. Thereafter, the motion of the two guide plates 5 and 5' and the two pressure-receiver plates 4 and 4' expanding and contracting the space in between them is repeated corresponding to the strengthening and weakening of the wind pressure, guided by the action of the shaft 6 through the forward and rear bearing beams 2 and 3.

On the other hand, the static pressure working on the pressure-receiver plates 4 and 4' acts as a force to expand them. This expanding force is converted into the thrust power of the shaft 6, and in order to place restraint on the expanding force by offering resistance to the thrust of the shaft, a coil spring 9 is fitted onto the shaft inbetween the guide and pressure-receiver plates.

By virtue of the above-mentioned mechanism, as long as the pressure of air blowing into the device is low, the aforesaid expanding force is checked by the resilient force of the spring, and the present device does not go into action. When the wind pressure increases little by little and, consequently, the static pressure increases in the space between the upper and lower combinations of guide and pressure-receiver plates, 5 and 4, and 5' and 4', respectively, the thrust of the shaft 6 increases gradually, and when it overpowers the resilient force of the spring, two combinations of guide and pressure-receiver plates go into the expanding action. The wind pressure at the moment immediately before the working of the present device is called the "minimum pressure". When the wind pressure exceeds the minimum pressure that is required for the working of the present device and increases, the static pressure inside also increases with it and makes the two guide plates and the two pressure-receiver plates expand, thus overcoming the resilient force of the spring. As the consequence, the passages "$a$" between the inside wall of the casing 1 and the downstream ends of the expanded guide plates 5 and 5' are gradually narrowed. Thereafter, when the wind pressure increases, the passages "$a$" become narrower to check the increase of air flow, and when the wind pressure decreases, the passages expand to prevent the decrease in air flow. In this manner, automatic regulation of air flow is repeated.

Reference is now made to FIG. 4. In this embodiment is shown a mechanism whereby, with the use of the regulating rod 7, the setting length of the spring 9 of the present device is manually adjustable from outside the device. The setting length of the spring 9 is changed, so as to select a desired value of air flow rate, by sliding the thumbscrew 15 provided at the upper part of the aforesaid regulating rod 7 along the guide slot $13_1$ in the calibrated board 13 indicating values of air flow rate. By changing the setting length of the spring 9 with the regulating rod 7, the resilient force of the spring can be adjusted. While using the same spring, when its setting length is made smaller, the resilient force of the spring 9 increases, and unless the expanding power of the two pressure-receiver plates 4 and 4' becomes considerably larger from an increase of the wind pressure, the plates are unable to expand, overpowering the resilient force of the spring, so the passages "$a$" are less liable to become narrower and will permit a relatively larger amount of air to flow. When the setting length of the spring 9 is made larger, the resilient force of the spring becomes weaker, so that a relatively low wind pressure will allow the passages "$a$" to become narrower and the amount of air flowing through them to decrease. When, on the other hand, it is desired to change by a large margin the setting range of rates of air flow to be treated, this is done by replacing the spring with another spring having a different spring constant.

Figure 6:
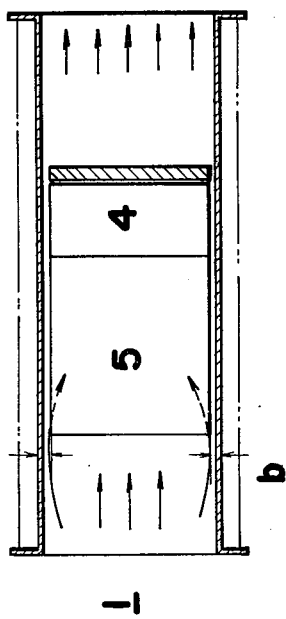
FIG. 6 is a rough sketch of a plane section of the device in accordance with this invention and shows the relation between it and the air streamline through the passage "$b$".

In FIG. 6 is shown the relation of the air currents at the right and left sides of the inside of the casing to the passages "$b$" between the walls and the two combinations of guide and pressure-receiver plates. Of the approaching wind pressure, the static pressure passes relatively smoothly through these passages "$b$" and enters the space between the two combinations of guide and pressure-receiver plates, thereby acting as a power to open and close the said plates. With the dynamic pressure, however, the passages act as a fluid resistance against it, and the greater part of it is prevented from entering the space between the guide and pressure-receiver plates, hence the dynamic pressure is not much of a power to open and close the two cimbinations of plates.

Figure 7:
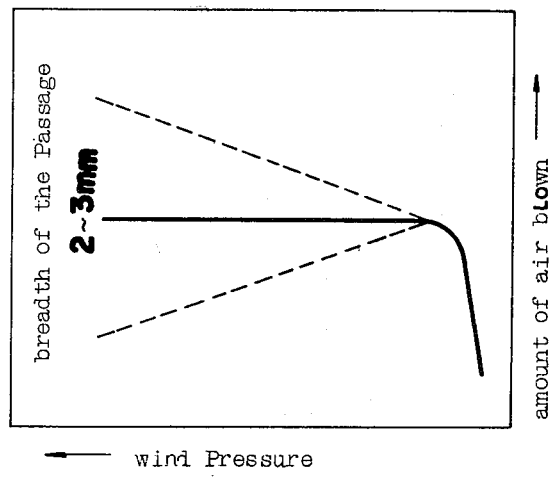
FIG. 7 is a chart showing the correlation of the breadth of the passage "$b$" with the wind pressure and the amount of air blown.

FIG. 7 is a chart of the air characteristic, showing the relation between the above-mentioned passages "$b$" and the control of air flow rate by the present device. It shows the tendency of the air flow rate to increase or decrease in relation to the the relative breadth of the passages "$b$", with the use of one spring at a constant setting height. When the passages "$b$" are made wider, it so happens, with increases in the approaching wind pressure, that the greater portion of the opening-and-closing power of the guide and pressure-receiver plates is derived from the total pressure, and the previously mentioned passages "$a$" approach a state where they have been narrowed to the fullest extent. When, on the other hand, the passages "$b$" are made extremely narrow, the resistance to the flow of air increases and, as a result, even the static pressure is prevented to a certain degree from entering the space between the guide and pressure-receiver plate, not to speak of the dynamic pressure. Consequently, the source of power for opening and closing the guide and pressure-receiver plates becomes extrememly small, and the passages "$a$" fall into a fully-open state. Therefore, the increase in wind pressure is immediately converted into velocity head, and this results in an increase in air flow rate, making it impossible to maintain the air flow rate at a constant level. The applicant conducted a series of experiments to find the optimum figures for the breadth of these passages "$b$", and it was established that when the breadth is set at approximately two to three millimeters, it is possible to maintain the air flow rate at a constant level, overcome fluctuations in the wind pressure, and to conduct a stabilized control of the amount of air flow.

The purpose in fitting an auxiliary spring $9_1$ onto the shaft, concentrically with the spring 9 to the axis of the shaft, as shown in FIGS. 2 and 3, is explained in the following.

The purpose is to overcome this shortcoming: sympathetic vibrations — the so-called "damping" — which occur when the vibration frequency of the spring coincides with the pulsating cycle of the wind pressure working in the present device. By additionally fitting the auxiliary spring $9_1$ which has approximately the same spring constant as the spring 9 and by bringing the two springs into a joint action, thus doubling the spring constant, the time when sympathy occurs is staggered. In practical application, the spring constant of the spring 9 is determined at a value which will not give rise to sympathetic vibrations when the wind pressure is near its minimum, and so that the spring will come to work together with the auxiliary spring $9_1$ when the wind pressure is near its maximum — generally, when it stands at values of approximately 150 to 200 mmAq.

The auxiliary spring $9_1$ has a smaller diameter than the spring 9; it is fitted inside the spring 9; and its free length is made shorter than the spring 9. Thus, in the low wind pressure range, only the spring 9 works; and when, with high wind pressure, sympathetic vibrations are about to occur, the auxiliary spring $9_1$ gets into contact with the seat $6_2$ and goes into a joint action with the spring 9. The auxiliary spring $9_1$ is, therefore, in a free, idle state in the low wind pressure range.

The construction and operation of the controlling device in accordance with the present invention, which have been described in details in the foregoing, may be summarized in the following outline. On a shaft inside the casing of the device which is interposed between the ducts, an approximately rhombiform combination of two long guide plates and two short pressure-receiver plates is established, their joints forming hinges. Such a combination of the plates is capable of expanding and contracting in the direction at a right angle to said shaft which is capable of sliding through the medium of a spring. With increases or decreases of the wind pressure, a balance is maintained between the expanding and contracting movement of the guide and pressure-receiver plates and the resilient force of the spring. The device has, therefore, the following effects simultaneously.

A. The motion of opening and closing is done in a stabilized manner since only the static pressure of the total pressure working in the duct is utilized as the source of power for such motion, as was stated at the beginning of this section of the specification.

B. Occurrence of a loud air current noise, as is generally the case with the conventional types of control devices due to the use of an air-throttling mechanism in them, can be obviated, because in the present device, the air current is first made to gradually contract towards the direction of its progress and is then made, after passing through the narrowest point in the passages "$a$", to gradually expand in order that the occurrence of vorticose current may be minimized, and besides, the said passages "$a$" are not so constructed as to put obstacles in the way of air current, for instance, by the use of perforated plates and the like.

C. As previously stated, it is possible to prevent the phenomenon of sympathetic vibrations with the pulsating wind pressure in a certain range of the pulsing pressure inside th duct, as is often the case with the conventional types of controlling devices.

It will be seen from the foregoing that an automatic controlling device for maintaining a constant rate of air flow in accordance with the present invention is of simple construction and can be manufactured at low cost. Its operation is simple, easy and smooth; and it effectively performs the function of keeping the air flow rate at a constant level by working in a stabilized manner.

It is to be clearly understood that the scope of claim of the present invention is by no means restricted to the aforementioned example of its embodiment but that some variations and modifications, in so far as they do not deviate from the spirit of this invention, also come within the scope of claim of the present invention.

What is claimed is:

1. An automatic controlling apparatus for maintaining constant air flow through an air-conditioning duct, said apparatus comprising:

an open-ended casing fitted into said air conditioning duct in the direction of the air flowing in said duct, whereby the air flowing through said duct flows through said casing;

two bearing beams fitted crosswise in said casing, the first beam at the forward upstream portion of the casing and the second beam at the rearward downstream portion of the casing, both of said beams having a hole through the center thereof, said holes aligned with each other in the center of said casing;

a shaft slidably fitted through said holes in said bearing beams;

spring means concentrically surrounding and attached at one end to said shaft at substantially the central portion thereof for biasing against the sliding movement of said shaft;

adjustable regulating means adjacent and contacting said spring means for adjusting the biasing strength of the spring means acting against the sliding motion of the slidable shaft;

upper and lower pressure receiving plates hingedly connected along one end to said reward bearing beam, and symmetrically positioned on both sides of said shaft with the free ends extending toward the forward direction of said casing;

upper and lower guide plates hingedly connected along one end to the free ends of said upper lower pressure-receiving plates respectively and symmetrically positioned on both sides of said shaft with the free ends of said guide plates extending toward the forward direction of said casing; and fastening means adjustably fixed to the forward edge of said slidable shaft and hingedly connected to the free ends of said upper and lower guide plates for fastening the guide plates to said slidable shaft.

* * * * *